United States Patent [19]
Djakovic

[11] Patent Number: 5,592,654
[45] Date of Patent: Jan. 7, 1997

[54] APPARATUS AND METHOD FOR CONVERTING A JOB CONFORMING TO A FIRST PROTOCOL INTO A JOB CONFORMING TO A SECOND PROTOCOL

[75] Inventor: Vladan Djakovic, San Jose, Calif.

[73] Assignee: Integrated Device Technology, Inc., Santa Clara, Calif.

[21] Appl. No.: 253,457

[22] Filed: Jun. 3, 1994

[51] Int. Cl.⁶ .................................. G06F 13/10
[52] U.S. Cl. .................. 395/500; 395/670; 364/239.9
[58] Field of Search .................................. 395/650, 700, 395/725, 500

[56] References Cited

U.S. PATENT DOCUMENTS

| | | | |
|---|---|---|---|
| 4,839,798 | 6/1989 | Eguchi et al. | 395/650 |
| 4,918,595 | 4/1990 | Kahn et al. | 395/650 |
| 5,031,089 | 7/1991 | Liu et al. | 395/725 |
| 5,257,372 | 10/1993 | Furtney et al. | 395/650 |
| 5,313,614 | 5/1994 | Goettelmann et al. | 395/500 |
| 5,345,396 | 9/1994 | Yamaguchi | 395/500 |
| 5,392,430 | 2/1995 | Chen et al. | 395/650 |

*Primary Examiner*—Krisna Lim
*Attorney, Agent, or Firm*—Skjerven, Morrill, MacPherson, Franklin & Friel

[57] ABSTRACT

A peripheral device preprocessor in which jobs conforming to a source protocol, e.g., a source graphical image description language, are accepted and processed to form new jobs according to a target protocol, e.g., a target graphical image description language. Jobs, which are formed according to the source protocol, are submitted by a client computer to the peripheral preprocessor. The peripheral preprocessor processes the job according to the source protocol to produce a bit-mapped image. The bit-mapped image is processed by the peripheral preprocessor to form a new job according to the target protocol. The new job is then submitted to a peripheral device which processes jobs according to the target protocol. In this way, a job is submitted according to a source protocol and is ultimately processed by the peripheral device according to a different, target protocol.

15 Claims, 9 Drawing Sheets

APPARATUS AND METHOD FOR CONVERTING A JOB CONFORMING TO A FIRST PROTOCOL INTO A JOB CONFORMING TO A SECOND PROTOCOL

FIELD OF THE INVENTION

The present invention relates to data processing and, in particular, to the conversion of a peripheral device job which conforms to a first protocol to conform to a second protocol.

BACKGROUND OF THE INVENTION

Many currently available computer software applications generate high-quality graphical images for display on a high-quality printing device such as a linotype or other high-quality, high-resolution printing device. Such a printing device typically accepts, as input, jobs which conform to a particular protocol. One such protocol is a graphical image description language known as PostScript®, which is available from Adobe Systems Inc. of Mountain View, Calif. A job is a collection of data which define a task to be performed by a computing device, e.g., a printing device. Processing jobs according to a particular protocol is sometimes called herein "supporting" or "implementing" the particular protocol.

Over time, new protocols for high-quality graphics are developed, and new computer software applications are written to produce jobs which conform to such new protocols. Such new computer software applications do not always support older protocols for high-quality graphics which may be required by older high-quality, high-resolution printing devices. Older high-quality printing devices can be upgraded to support newer protocols but typically at a cost of $10,000 or more.

SUMMARY

In accordance with the present invention, a peripheral preprocessor accepts jobs which conform to a source protocol and derives therefrom jobs which conform to a target protocol. A job, which conforms to a source protocol, is submitted for processing to a computer peripheral device (i.e., peripheral device), which accepts jobs conforming to a target protocol, by first submitting the job to the peripheral preprocessor. The peripheral preprocessor processes the job according to the source protocol and generates a new job, which conforms to the target protocol, and submits the new job to the peripheral device. The new job is generated by first producing data in a format common to the source protocol and the target protocol, e.g., a bit-mapped image, and building from that data the new job. The peripheral preprocessor can be made inexpensively and can be included in a computer which is a client of the peripheral device. By using a peripheral preprocessor in accordance with the present invention, expensive upgrades of high quality peripheral devices can be avoided and significant improvements in performance are realized as described more completely below.

DETAILED DESCRIPTION

Figure 1A:
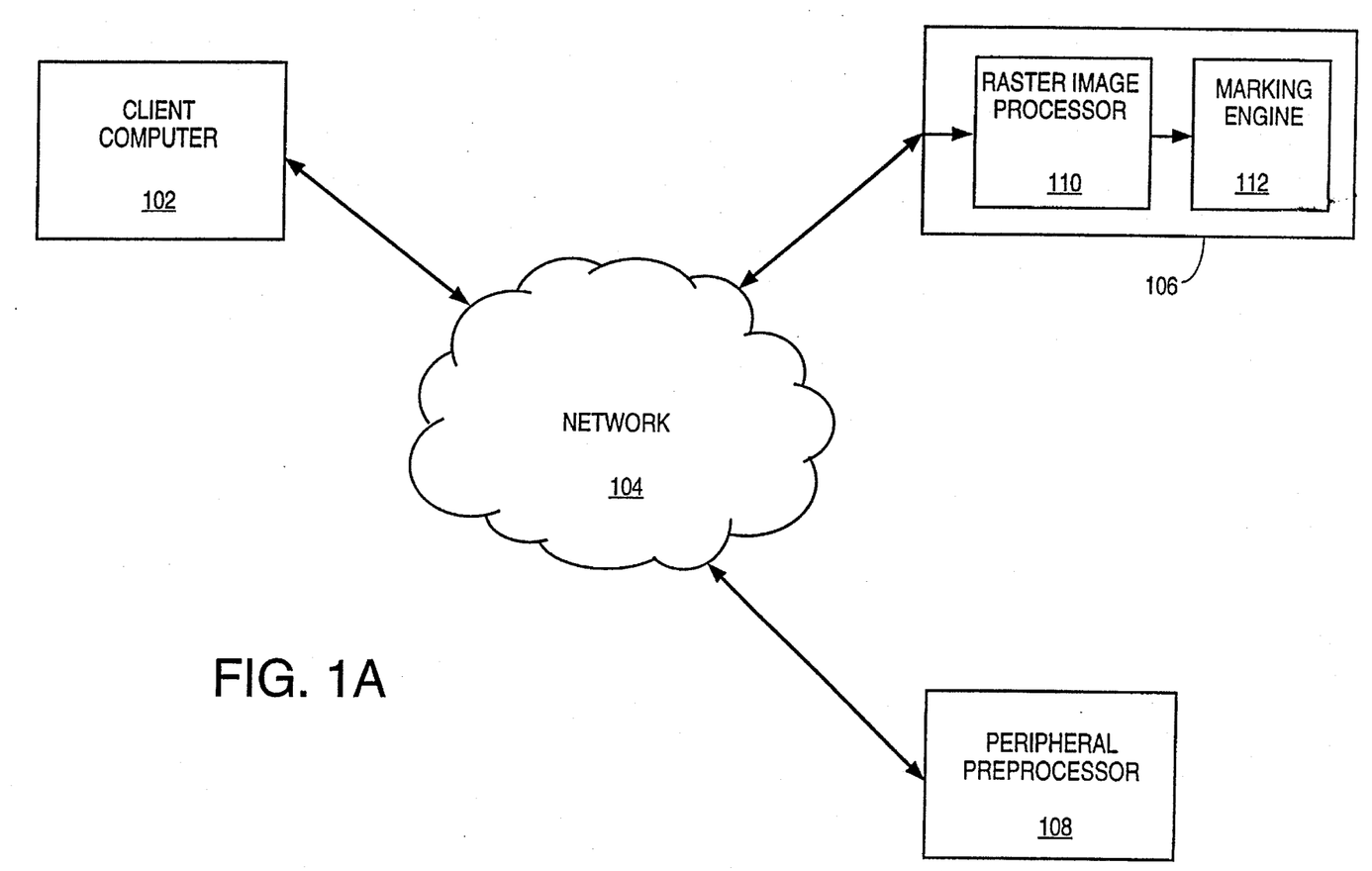
FIG. 1A is a block diagram of a network to which a computer, a peripheral device and a peripheral preprocessor in accordance with the present invention are attached.

According to the present invention, a peripheral preprocessor 108 (FIG. 1A) maintains compatibility of a computer 102, which generates jobs according to a source protocol, with a peripheral device 106, which processes jobs according to a target protocol, by accepting jobs from computer 102 according to source protocol and building from the accepted jobs and submitting to peripheral device 106 new jobs according to the target protocol. As used herein, a peripheral device is a computing device which is generally dedicated to a specific purpose such as input/output operations, networking, or rendering graphical images. FIG. 1A shows computer 102, which is connected through a network 104 to peripheral device 106 and peripheral preprocessor 108. Computer 102 generates jobs for peripheral device 106 according to the source protocol. Peripheral device 106 accepts jobs which conform to the target protocol, which is different from the source protocol, from computer 102 and other clients (not shown) through network 104. Peripheral preprocessor 108 accepts from computer 102 through network 104 jobs, which are destined for peripheral device 106 and which conform to the source protocol, and generates from the accepted jobs and sends to peripheral device 106 new jobs according to the target protocol.

As used herein, a job is a collection of data which define a task to be performed by a computing device such as peripheral device 106. In one embodiment, peripheral device 106 is a high-quality, high-resolution printing device and a job is a collection of data which collectively define a graphical image to be rendered by peripheral device 106. As used herein, a printing device is a graphical display device which renders graphical images onto substantially permanent media such as paper or transparency film, and a graphical display device is a peripheral device whose specific purpose is the rendering of graphical images.

In this same illustrative embodiment, the source protocol is the PostScript® Level 2 graphical image description language available from Adobe Systems Inc. of Mountain View, Calif., and the target protocol is the PostScript® Level 1 graphical image description language which is also available from Adobe Systems Inc. Peripheral device 106 includes a raster image processor 110 (i.e., RIP 110) and a marking engine 112. Raster image processors and marking engines are described in greater detail below.

FIGS. 1B, 1C, 1D, and 1E show alternative embodiments in which peripheral preprocessor 108 is (i) placed between network 104 and peripheral device 106, (ii) attached directly to computer 102, (iii) included within computer 102, and (iv) attached directly between computer 102 and peripheral device 106, respectively. Each of these alternative embodiments is described in greater detail below.

Figure 2:
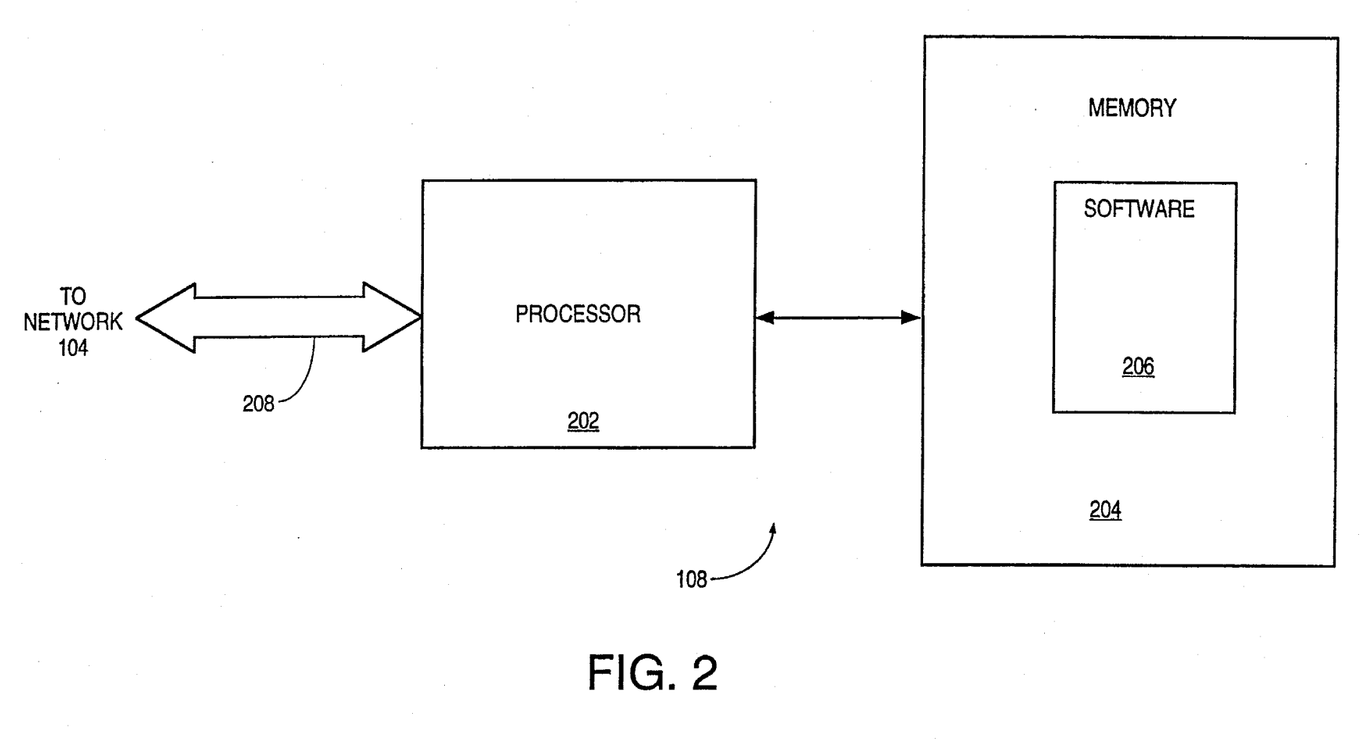
FIG. 2 is a block diagram of a peripheral preprocessor formed in accordance with the present invention.

Peripheral preprocessor 108 (FIG. 1A) is shown in greater detail in FIG. 2. A processor 202 is connected through a connection 208 to network 104 (FIG. 1A). Processor 202 (FIG. 2), in one embodiment, is the R3000 processor available from Integrated Device Technology, Inc. of Santa Clara, Calif. Processor 202 is connected through a bus to a memory 204. Memory 204 can include any type of memory including randomly accessible memory (RAM), read-only memory (ROM), and non-volatile memory such as magnetic disks. In one embodiment, processor 202 and memory 204 are combined onto a single board, e.g., the RS503 board also available from Integrated Device Technology, Inc. Memory 204 contains software 206 which is executed by processor 202 using conventional techniques.

Figure 3:
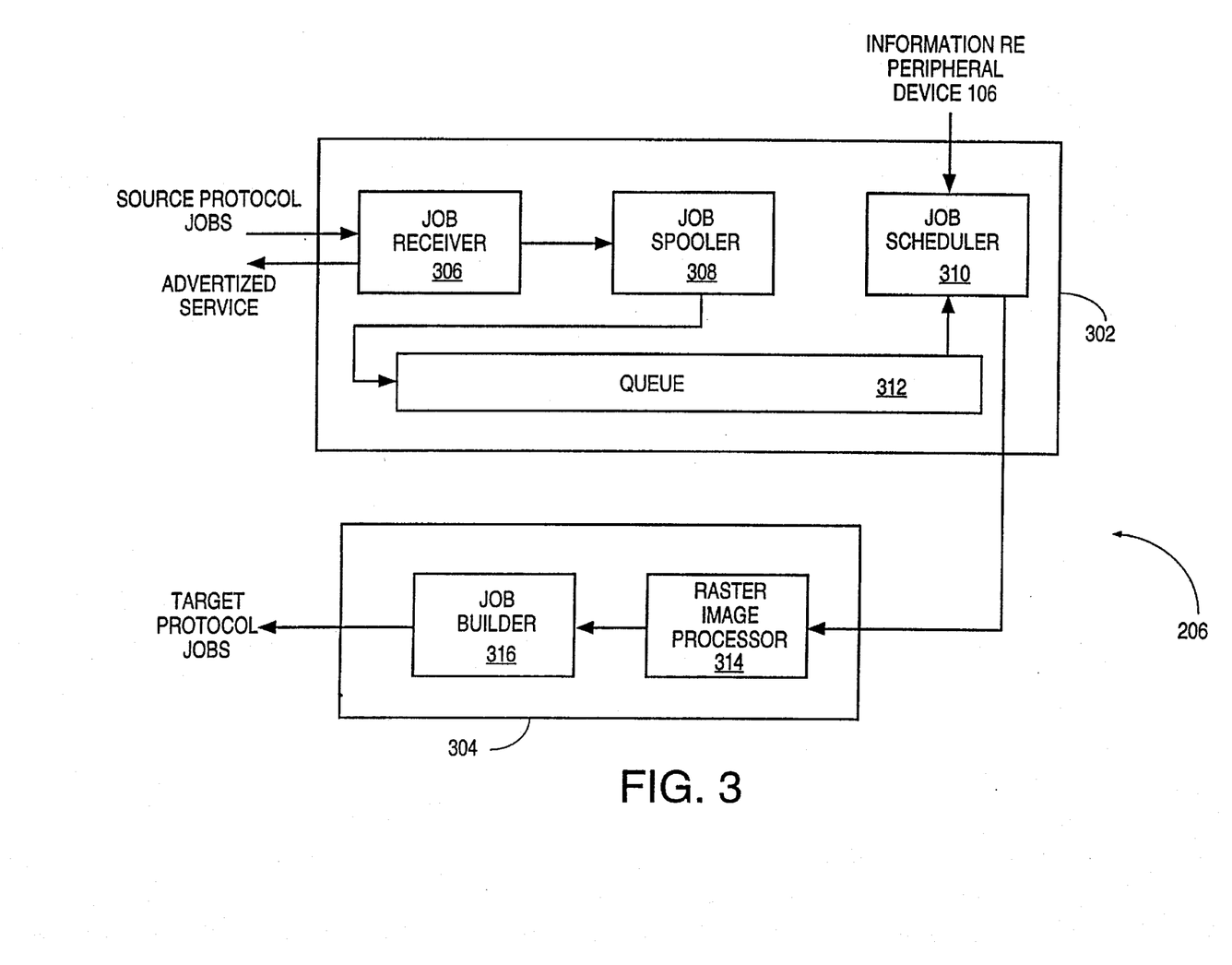
FIG. 3 is a block diagram of a first embodiment of the software of the peripheral preprocessor of FIG. 2.

Software 206 is shown in greater detail in FIG. 3. Software 206 includes a job handler 302 which handles jobs received through network 104 (FIG. 1A). Job handler 302 (FIG. 3) includes a job receiver 306 which receives jobs from network 104 (FIG. 1A) in the manner that currently available peripheral devices, such as peripheral device 106, receive jobs. Job receiver 306 (FIG. 3) also advertises services provided by peripheral preprocessor 108 (FIG. 1) through network 104.

Services are advertised by sending messages through network 104, which identify peripheral preprocessor 108 as a peripheral device capable of accepting and processing jobs according to the source protocol, to potential clients of peripheral preprocessor 108. Potential clients of peripheral preprocessor 108 are computing devices, such as computer 102, which are capable of generating jobs for a peripheral device according to the source protocol. Once computer 102 receives a message through network 104 identifying peripheral preprocessor 108 as a peripheral device capable of receiving and processing jobs according to the source protocol, a user of computer 102 can generate jobs according to the source protocol and send those jobs through network 104 to peripheral preprocessor 108. This is true since computers typically provide users with the ability to choose, from a list of available peripheral devices, a peripheral device to which to send a particular job. By advertising services through network 104, peripheral preprocessor 108 causes computer 102 to include peripheral preprocessor 108 in such a list.

Job receiver 306 (FIG. 3) retrieves the job from network 104 (FIG. 1A) and transmits the job to a job spooler 308. Job spooler 308 places the job on a queue 312 in a first-in-first-out manner. A job scheduler 310 schedules jobs stored in queue 312 for processing. Job scheduler 310 selects from the jobs stored in queue 312 a job to be processed next, removes the job from queue 312, and passes the job to a new job generator 304 which is described in greater detail below.

Job scheduler 310 selects a particular job from queue 312 according to any known job scheduling technique which suits the needs of the particular clients, and users of those clients, of peripheral preprocessor 108 (FIG. 1A). In one embodiment, jobs are scheduled in a first-in-first-out manner. In another embodiment, job scheduler 310 (FIG. 3) can schedule high-priority jobs ahead of lower priority jobs. In such an embodiment, data within each job indicates the relative priority of the job, and job scheduler 310 accesses that data. Furthermore, in some embodiments, job scheduler 310 schedules jobs based in part on information regarding the current state of peripheral device 106 (FIG. 1A).

Job scheduler 310 (FIG. 3) obtains such information by querying peripheral device 106 (FIG. 1A), either directly, as is the case in the embodiment shown in FIG. 1B and described below, or through network 104, as is the case in the embodiment shown in FIG. 1A. Some peripheral devices such as peripheral device 106 provide information, such as the type and size of paper currently ready for rendering of graphical images, in response to queries using conventional techniques. As described above, computer 102 and peripheral preprocessor 108 are clients of peripheral device 106. Other information, which is typically provided in response to queries by clients of peripheral device 106, includes, for example, the particular fonts which are installed in the peripheral device.

Job scheduler 310 uses such information to select a job from the jobs stored in queue 312 for processing by new job generator 304. For example, if job scheduler 310 has information that peripheral device 106 is currently set up to render graphical images on transparency film, job scheduler 310 selects from queue 312 the job nearest the front of queue 312 which defines a graphical image to be rendered on a transparency film.

New job generator 304 (FIG. 3) is connected to job handler 302. New job generator 304 receives from job scheduler 310 of job handler 302 jobs and builds from the received jobs new jobs according to the target protocol. New job generator 304 includes, in one embodiment, a raster image processor 314, which is sometimes called herein RIP 314. RIP 314 processes jobs received from job scheduler 310 and generates, for each job, a bit-mapped image which can be rendered by marking engine 112 (FIG. 1A) of peripheral device 106.

A marking engine is the logic, circuitry and machinery of a graphical display device which physically renders the graphical image specified by a particular job onto a graphical medium, such as paper, film or a cathode-ray tube. A bit-mapped image is a collection of data which specifies a color for each pixel to be rendered by a peripheral graphics device. For example, a bit-mapped image, which specifies an image in black and white which is dimensioned 100 pixels by 100 pixels, specifies whether each of the 10,000 pixels is black or white. In one embodiment, RIP 314 (FIG. 3) includes the Configurable PostScript® Interpreter (CPSI) available from Adobe Systems Inc. and processes jobs according to the PostScript® Level 2 graphical image description language.

RIP 314 customizes the bit-mapped image, which RIP 314 generates from a processed job, to peripheral device 106. Jobs received by RIP 314 include information regarding rendering parameters of images rendered by peripheral device 106 (FIG. 1A) including the imageable area size, the resolution and the depth of peripheral device 106. Such information is provided by the vendor of peripheral device 106 and is stored in clients of peripheral device 106, e.g., computer 102. For example, if the target protocol is the PostScript® graphical image description language, a PostScript® Printer Definition file is stored in computer 102. PostScript® Printer Definition files are well-known. Jobs originating within computer 102 include information regarding peripheral device 106 retrieved from the PostScript® Printer Definition file.

The imageable area size of peripheral device 106 is the size of the area into which an image can be rendered. Such a size is typically the size of paper or film onto which peripheral device 106 can render graphical images less some small margin on each edge of the paper or film. The resolution of peripheral device 106 is the number of pixels that can be rendered per unit of area. For example, various printer peripheral devices can render images at 300 pixels, or dots, per inch (dpi) by 300 dpi, at 600 dpi by 600 dpi, at 1024 dpi by 1024 dpi or more. The depth of peripheral device 106 is the number of bits of data stored for each pixel. For example, if peripheral device 106 can display only black or white, only one bit is stored for each pixel. If peripheral device 106 can display only sixteen (16) levels of grey, four bits are stored for each pixel. Some peripheral devices store thirty-two (32) bits, i.e., four (4) bytes, for each pixel including one byte for cyan, one byte for magenta, one byte for yellow, and one byte for black. In one embodiment, peripheral device 106 is an AGFA ProSet 9800 printing device available from Agfa Div Miles Inc. of Torrance, Calif. and has a variable imageable area size, a resolution of 3600 dpi by 3600 dpi, and a depth of one bit.

The bit-mapped image generated by RIP 314 (FIG. 3) by processing a job received from job scheduler 310 is customized to the rendering parameters of peripheral device 106. For example, an image defined by a job can assume a different imageable area size, resolution, and/or depth than that supported by peripheral device 106. The image must then be resized to correspond to an imageable area size and resolution supported by peripheral device 106 and colors of the image must converted to a color model supported by peripheral device 106 As used herein, "colors" include black and white and various shades of grey. The bit-mapped image is customized by RIP 314 using conventional techniques typically used by currently available raster image processors.

RIP 314 transmits to a job builder 316 the bit-mapped image generated by processing a job received from job scheduler 310. Job builder 316 accepts the bit-mapped image and builds from the bit-mapped image a job conforming to the target protocol. As described above, peripheral device 106 (FIG. 1) accepts jobs which conform to the target protocol.

The target protocol, as do most graphical image description languages, provides for processing of bit-mapped images of a particular format. Thus, once the graphical description of a job retrieved from queue 312 (FIG. 3) is processed and reduced to a bit-mapped image, the bit-mapped image is formatted according to the target protocol. Since the bit-mapped image then conforms to the target protocol, peripheral device 106 (FIG. 1) accepts the bit-mapped image and renders the image defined by the bit-mapped image. In the embodiment described above in which the target protocol is the PostScript® Level 1 graphical image description language, job builder 316 (FIG. 3) inserts before the bit-mapped image the following graphical commands.

| | | |
|---|---|---|
| 1: | %!PS-Adobe-3.0 EPSF-3.0 | (1) |
| 2: | %%Creator: OracC Level Doubler v0.a | |
| 3: | %%BoundingBox: 0 0 612 792 | |
| 4: | %%EndComments | |
| 5: | %%BeginProlog | |
| 6: | %%EndProlog | |
| 7: | %%BeginSetup | |
| 8: | %%EndSetup | |

-continued

| | |
|---|---|
| 9: | 40 dict begin gsave |
| 10: | /xpix 3300 def |
| 11: | /ypix 2550 def |
| 12: | 612 792 scale |
| 13: | /linebuf 319 string def |
| 14: | /inlinestuff {begin xpix ypix 1 [xpix 0 0 ypix neg 0 ypix] /getinline load image end} def |
| 15: | /getinline {linebuf currentfile exch readhexstring pop} def |
| 16: | 12 dict begin currentdict end inlinestuff |

In each line of code excerpt (1), the text which is added immediately before the bit-mapped image follows a colon (":"). The number preceding the colon is a line number for reference. The meaning and purpose of each of the commands of code except (1), and of code excerpt (2) below, can be understood by reference to the PostScript Language Reference Manual, second edition, available from Adobe Systems, Inc. However, the commands are described for completeness.

Lines 1–8 are standard header comments which are typically found at the beginning of each job which conforms to the PostScript® graphical image description language. A raster image processor, such as RIP 110 (FIG. 1A) of peripheral device 106, ignores comments such as those in lines 1–8 of code excerpt (1). In other words, lines 1–8 of code excerpt (1) have no effect on the image ultimately rendered by peripheral device 106.

Line 9 of code excerpt (1) creates a dictionary and saves the current graphics state. Lines 10 and 11 of code excerpt (1) define data which represent the size of a page as defined by a number of pixels. Line 12 of code excerpt (1) specifies the imageable area size expressed in points. A point is used herein as it is commonly used in the art of typesetting; there are seventy-two (72) points in an inch.

Line 13 of code excerpt (1) defines a buffer in which one line of data can be stored. Line 14 of code excerpt (1) defines a procedure inlinestuff which creates a bit-mapped image from data which follows line 16. Procedure inlinestuff uses the known operator "image" of the PostScript® graphical image description language and a procedure getinline, which is defined in line 15 of code excerpt (1). Procedure getinline retrieves one line of data from the data which follow line 16 and stores the retrieved data in the buffer defined in line 13. Procedure inlinestuff is invoked in line 16 of code excerpt (1), thereby generating the bit-mapped image defined by the data which follow line 16 when processed by RIP 110 (FIG. 1A).

Immediately following the graphical image description language commands of code excerpt (1) is data defining the bit-mapped image produced by RIP 314 in hexadecimal format (FIG. 3). The following description language commands immediately follow the data defining the bit-mapped image.

| | | |
|---|---|---|
| 18: | grestore end | (2) |
| 19: | showpage | |

Line 18 of code excerpt (2) includes a command whose performance restores the graphical state of RIP 110 (FIG. 1A) and a command which discards the currently used dictionary and makes the previously used dictionary current. The nature and use of dictionaries in the PostScript environment is known and described in the PostScript Language Reference Manual described above. Line 19 is a command which causes RIP 110 to submit the bit-mapped image produced by the processing of the job by RIP 110 to marking engine 112, which then renders the image. Code excerpts (1) and (2) include commands which conform to the target protocol. Thus, by inserting code excerpt (1) before the bit-mapped image produced by RIP 314 (FIG. 3) and inserting code excerpt (2) after the bit-mapped image, a new job is generated according to the target protocol and, when processed by peripheral device 106 (FIG. 1A), renders the image defined by the bit-mapped image.

Once the new job is generated by job builder 316 (FIG. 3), job builder 316 transmits the job to peripheral device 106 (FIG. 1A) through network 104 in the manner that any client of peripheral device 106 transmits a job to peripheral device 106 using conventional techniques. As described more completely below, peripheral preprocessor 108 (FIG. 1B) in some embodiments is attached to peripheral device 106 directly, i.e., not through any network. In such embodiments, job builder 316 (FIG. 3) submits the newly generated job to peripheral device 106 as would any computer directly attached to peripheral device 106. The newly generated job is constructed according to the target protocol and therefore is processed by peripheral device 106 to render the graphical image defined by the newly generated job.

Thus, peripheral preprocessor 108 (FIG. 1A) accepts from computer 102 a job which conforms to a source protocol and generates from the accepted job a new job which conforms to a target protocol and submits the new job to peripheral device 106 which accepts and processes the new job. In this way, computer 102 can submit a job which conforms to the source protocol to peripheral device 106 which accepts only jobs which conform to the target protocol.

Substantial improvements in performance are realized in applying the principles of the present invention. This is true generally because the job which is ultimately processed by raster image processor 110 of peripheral device 106 is little more than a bit-mapped image. RIP 110 of peripheral device 106 produces, from jobs accepted by RIP 110, a bit-mapped image and transmits the bit-mapped image to marking engine 112. Marking engine 112 then renders the image defined by the bit-mapped image. Bit-mapped images therefore require relatively little processing by RIP 110 and generally pass quickly through RIP 110 to marking engine 112 of peripheral device 106. RIP 110 of peripheral device 106 is therefore substantially bypassed.

In the illustrative embodiment in which the source protocol is the PostScript® Level 2 graphical image description language and the target protocol is the PostScript® Level 1 graphical image description language, performance is improved relative to submitting jobs which conform to PostScript® Level 1 to peripheral device 106. This is true because PostScript® Level 2 interpreters, such as RIP 314 (FIG. 3), are generally faster than PostScript® Level 1 interpreters, such as RIP 110 (FIG. 1A). While the new job is ultimately processed by the PostScript® Level 1 interpreter, i.e., RIP 110, within peripheral device 106, the new job is little more than a bit-mapped image which is interpreted with minimal processing as described above.

Since RIP 110 of peripheral device 106 is substantially bypassed as described above, the task of processing jobs submitted by computer 102 is left primarily to peripheral preprocessor 108. Further improvements in performance are realized by using a particularly fast processor as processor 202 (FIG. 2) of peripheral preprocessor 108. Replacing the processor which executes the raster image processor of a purchased peripheral device such as peripheral device 106 is generally quite difficult and expensive and can be a practical impossibility in some cases. However, peripheral preprocessor 108 is manufactured independently of peripheral device 106 and can be made relatively inexpensively. Selection of a particularly faster processor as processor 202 of peripheral preprocessor 108 is therefore easily accomplished without requiring an upgrade of the hardware or software of peripheral device 106 (FIG. 1) which is typically quite expensive. Such an upgrade of a high-quality printing device can cost as much as $10,000 or more. Since the task of processing a job to generate a bit-mapped image is performed primarily by peripheral preprocessor 108 rather than by peripheral device 106, use of a particularly fast processor as processor 202 (FIG. 2) of peripheral preprocessor 108 results in a corresponding improvement in performance.

Figure 1B:
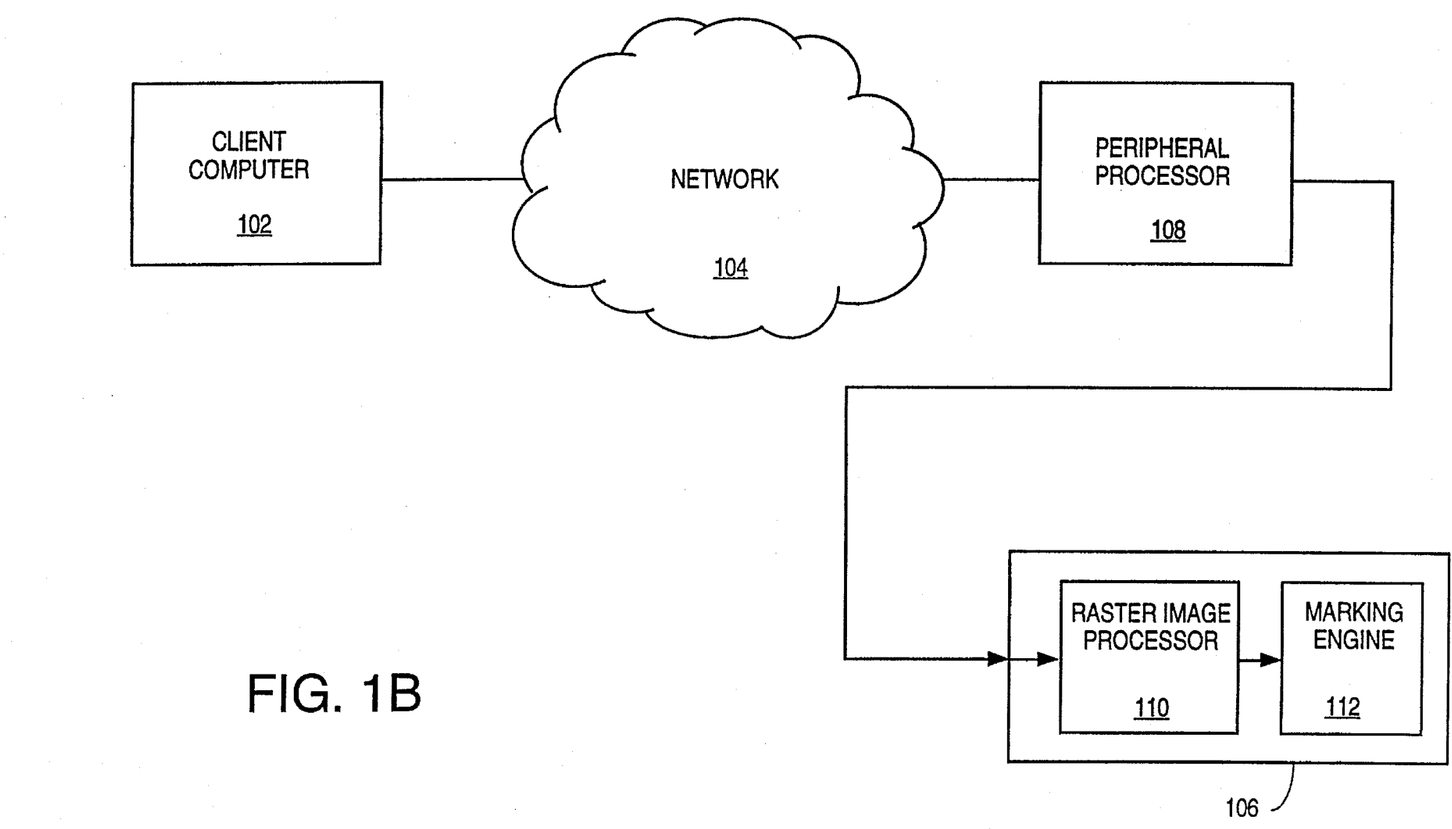
FIGS. 1B, 1C, 1D, and 1E are each a block diagram of a network to which a computer, a peripheral device and a peripheral preprocessor in accordance with a respective alternative embodiment of the present invention are attached.

It is appreciated that peripheral device 106 can be connected to peripheral preprocessor 108 directly as shown in FIG. 1B rather than through network 104. Such a connection would prevent jobs transmitted from peripheral preprocessor 108 to peripheral device 106 from burdening network 104. Therefore performance of network 104 can be enhanced by connecting peripheral device 106 directly to peripheral preprocessor 108. However, such a connection would prevent other clients of peripheral device 106 which are connected to network 104, such as computer 102, from submitting jobs which conform to the target protocol through network 104 to peripheral device 106 bypassing peripheral preprocessor 108. With peripheral device 106 and peripheral preprocessor 108 both connected to network 104 as shown in FIG. 1A, network 104 supports submission by computer 102 of both jobs which conform to the source protocol and jobs which conform to the target protocol.

Figure 1C:
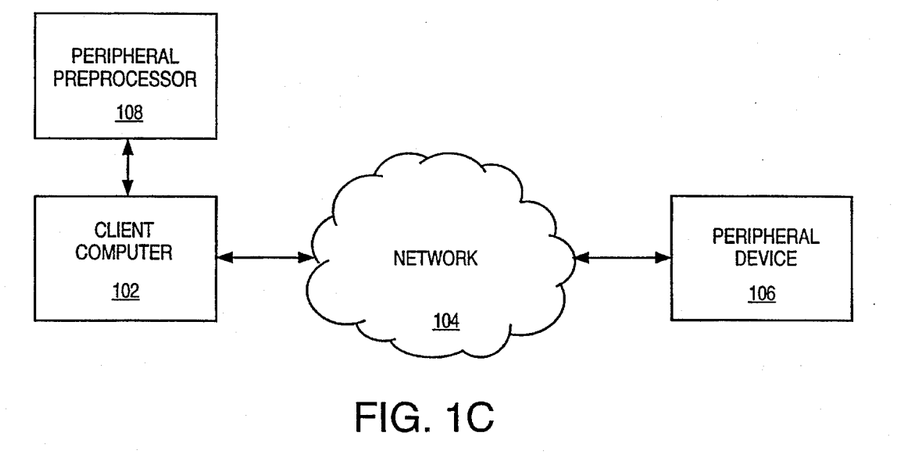
Figure 1D:
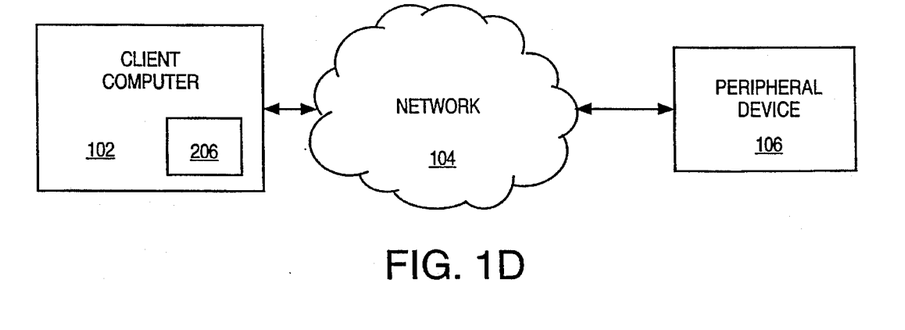

Another embodiment is shown in FIG. 1C. Peripheral preprocessor 108 is attached directly to computer 102. Peripheral preprocessor 108 is not connected directly to network 104 but is instead connected to network 104 only through computer 102. For example, peripheral preprocessor 108 can be implemented in the RS503 board, which is available from Information Device Technology, Inc. as described above and which is placed into a Nubus slot of a Macintosh® computer available from Apple Computers, Inc. of Cupertino, Calif. In the embodiment of FIG. 1C, communication of jobs between computer 102 and peripheral preprocessor 108 does not burden network 104. Furthermore, jobs conforming to either the source protocol or the target protocol can be submitted by computer 102 to peripheral device 106 as jobs conforming to the source protocol are first processed by peripheral preprocessor 108 before being submitted to peripheral device 106 through network 104.

While it is described herein that software 206 is processed within peripheral preprocessor 108, it is appreciated that software 206 (FIGS. 1D and 2) can be implemented in computer 102, especially if computer 102 supports a multitasking operating environment. In such an embodiment, jobs which conform to the source protocol are submitted to software 206 executing within computer 102. Software 206 then generates, from the submitted jobs, new jobs which conform to the target protocol and submits the new jobs through network 104 to peripheral device 106. The embodiment shown in FIG. 1D has the relative advantages and disadvantages of the embodiment shown in FIG. 1C. Furthermore, the embodiment of FIG. 1D does not require any hardware modification of computer 102, network 104 or peripheral device 106 and can be implemented rather inexpensively. However, any processing by software 206 within computer 102 burdens the central processor of computer 102 and impedes the use of computer 102 for other tasks.

Figure 5:
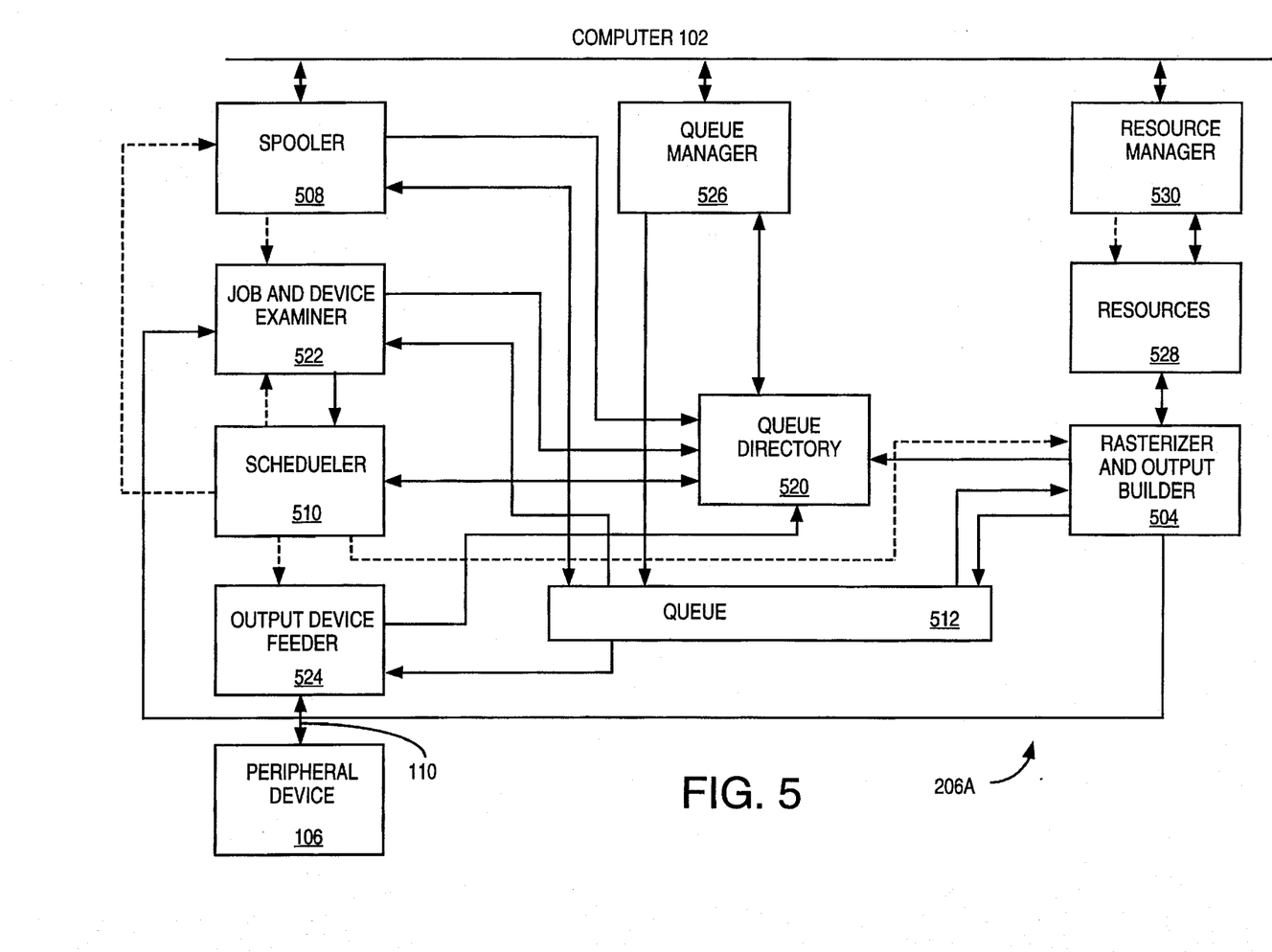
FIG. 5 is a block diagram of a second embodiment of the software of the peripheral preprocessor of FIG. 2.

It is further appreciated that peripheral preprocessor 108 (FIG. 1E) can be connected between computer 102 and peripheral device 106. For example, the RS503 board, which is available from Information Device Technology, Inc. as described above and which is placed into a Nubus slot of a Macintosh® computer available from Apple Computers, Inc., includes an interface 110 which conforms to the known SCSI (Small Computer Serial Interface) peripheral device connection protocol. Peripheral device 106 is connected to peripheral preprocessor 108 through interface 110. In this embodiment, peripheral preprocessor 108 executes software 206A, which executes in a manner that is directly analogous to the execution of software 206 (FIG. 2) and which is shown in greater detail in FIG. 5. In FIG. 5, dashed arrows are used to represent flow of control and solid arrows are used to represent flow of data.

Software 206A (FIG. 5) includes a spooler 508 which receives a job through network 104 and places the job on a queue 512. Spooler 508 also forms a directory entry which describes the state of the job and adds the directory entry to a queue directory 520. Spooler 508 then notifies a job and device examiner 522 that the job has been added to queue 512.

Figure 6:
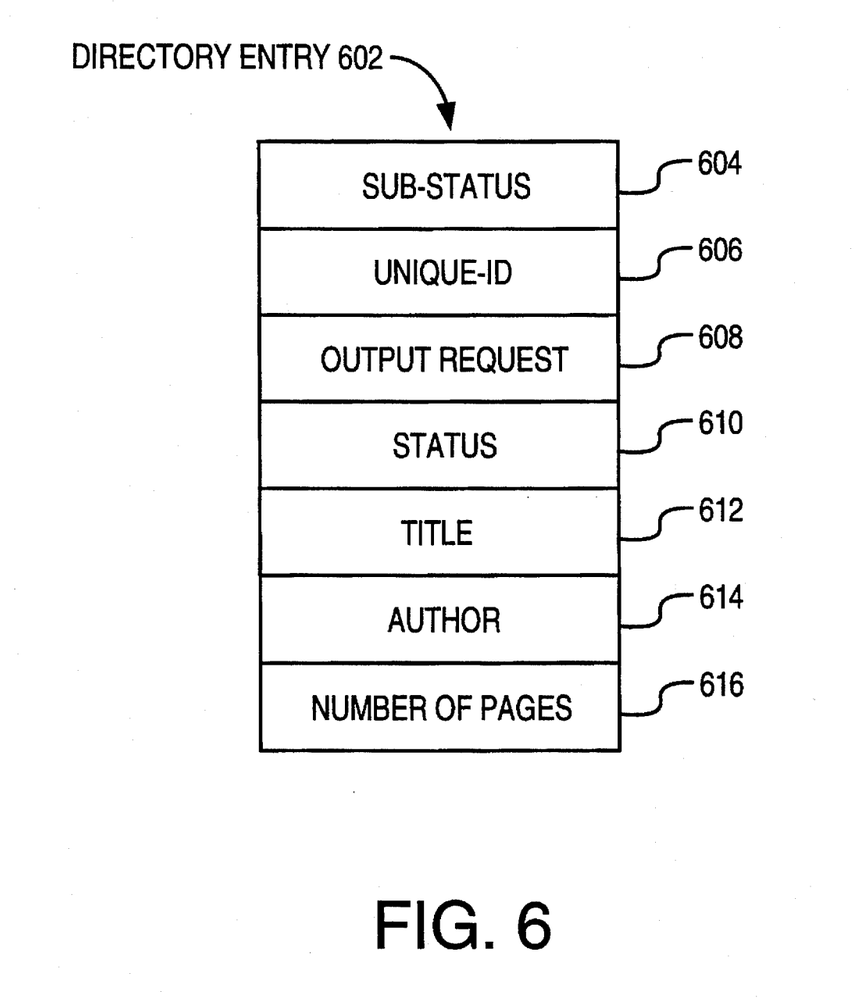
FIG. 6 is a block diagram of a directory entry used by the embodiment of FIG. 5.

Job and device examiner 522 retrieves information from queue 512 and from jobs within queue 512 and updates directory entries in queue directory 520. A directory entry 602 is shown in FIG. 6.

Directory entry 602 includes a number of fields, each of which includes data describing a portion of the state of a job, which corresponds to directory entry 602, in queue 512 (FIG. 5). Directory entry 602 (FIG. 6) includes (i) a sub-status field 604, (ii) an identifier field 606, (iii) an output request field 608, (iv) a status field 610, (v) a title field 612, (vi) an author field 614, and (vii) a length field 616.

Sub-status field 604 represents the status of the corresponding job with respect to queue 512 (FIG. 5) and describes whether the corresponding job is spooled, i.e., available to be processed as described below, or is suspended, i.e., not available. Identifier field 606 (FIG. 6) identifies the job uniquely with respect to other jobs in queue 512 (FIG. 5). Output request field 608 (FIG. 6) describes the particular type or class of peripheral device and the particular configuration of peripheral device to which the job should be submitted. For example, output request field 608 can specify a particular class of peripheral device and that the job should be rendered on transparency film rather than paper.

Status field 610 describes whether the corresponding job is spooled, suspended, or processing. As described above, if a job is available for processing, the job is spooled; otherwise, the job is suspended. A job is processing if the job is currently being processed by rasterizer 504 or by output device feeder 524, each of which are described in greater detail below. There is some redundancy in status field 610 and sub-status field 604 in that, if status field 610 indicates that a job is suspended, sub-status field 604 similarly indicates that the job is suspended. Otherwise, sub-status field 604 indicates that the job is spooled, irrespective of whether status field 610 indicates that the job is spooled or processing.

Title field 612 describes the title of the job as defined by the job itself. According to some known peripheral device protocols, a job includes data which defines a title of the job. In forming directory entry 602, title field 612 is derived from such information in the corresponding job.

Author field 614 identifies the user on whose behalf the corresponding job was created. Length field 616 describes the length of the corresponding job, e.g., in terms of the number of pages required to render the graphical image defined by the corresponding job. Author field 614 and length field 616 are each derived from the corresponding job itself in a manner which is analogous to the derivation of title field 612 as described above. Some peripheral device protocols do not provide for such author and length information in a job. As a result, author field 614 and length field 616 are optionally included in directory entry 602.

Job and device examiner 522 also obtains information regarding any peripheral devices connected to interface 110. Not all currently available peripheral devices respond to queries regarding the current status of the peripheral device. However, a peripheral devices that does respond is queried by job and device examiner 522 and information regarding the state of such a peripheral device is communicated to a scheduler 510.

Scheduler 510 (FIG. 5) retrieves from queue directory 520 and job and device examiner 522 information regarding, respectively, jobs in queue 512 and peripheral devices connected to interface 110, e.g., peripheral device 106. If peripheral device 106 does not provide information regarding the current state of peripheral device 106 in response to queries by job and device examiner 522, scheduler 510 uses other information to deduce the likely state of peripheral device 106. For example, if peripheral device 106 most recently accepted and completed a job which required a particular size of paper, scheduler 510 assumes that peripheral device 106 still contains that particular type of paper. Scheduler 510 uses the information to schedule processing of jobs in queue 512 by rasterizer 504 and output device feeder 524.

Rasterizer 504 retrieves from queue 512 jobs which conform to the source protocol and generates and places onto queue 512 jobs which conform to the target protocol. The operation of rasterizer 504 is analogous to the operation of new job generator 304 (FIG. 3), which is described above. Rasterizer 504 (FIG. 5) uses resources 528 to process a job retrieved from queue 512 according to the source protocol to derive a bit-mapped image as described above with respect to new job generator 304 (FIG. 3). Resources 528 are resources used in the processing of jobs according to the source protocol and include, for example, bit-mapped fonts, forms, procedures, and color rendering protocols. Such resources are commonly used in known graphical image description languages.

From the bit-mapped image, a job which conforms to the target protocol is built by rasterizer 504, as described more completely above with respect to new job generator 304 (FIG. 3), and placed onto queue 512 (FIG. 5). As described above, peripheral device 106 includes RIP 110 (FIG. 1A) which processes jobs according to the target protocol. When rasterizer 504 places a job onto queue 512, rasterizer 504 updates a directory entry in queue directory 520 corresponding to the job.

A resource manager 530 is in data communication with computer 102 and resources 528. Resource manager 530 provides to computer 102 information describing which resources 528 are installed in software 206A. Resource manager 530 also receives from computer 102 resources which are added, by resource manager 530, to resources 528 and removes, in response to instructions received from computer 102, resources from resources 528.

Figure 1E:
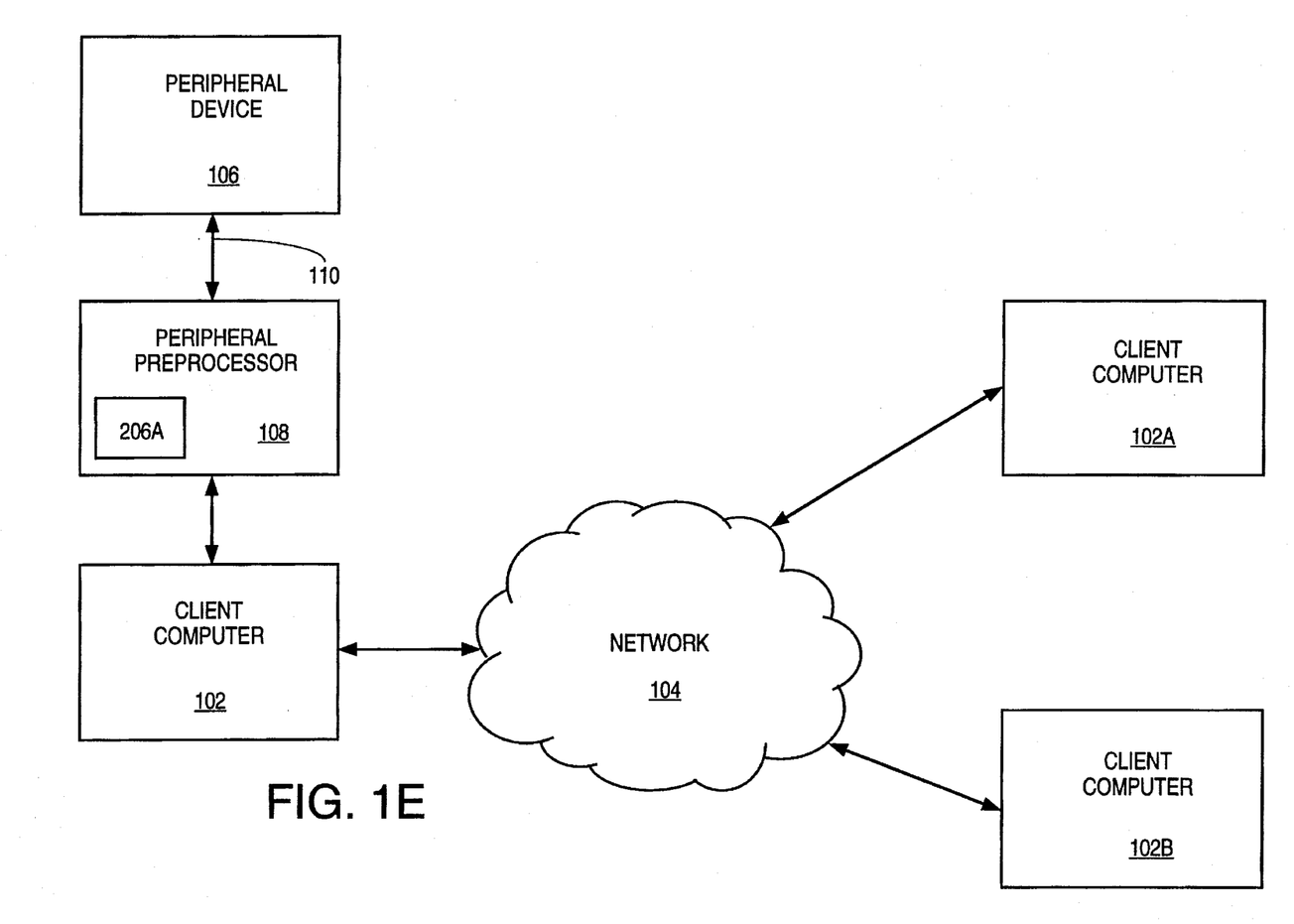

By loading resources, e.g., fonts, which are frequently used by jobs submitted to peripheral preprocessor 108 (FIG.

1E) into peripheral preprocessor 108, a user can improve performance of peripheral preprocessor 108. Resources which are not included in resources 528 (FIG. 5) generally must be included in jobs received from computer 102 by spooler 508. Thus, avoiding the repeated transfer of resources which are frequently used by jobs submitted to peripheral preprocessor 108 by including such resources in resources 528 improves performance of peripheral preprocessor 108.

Output device feeder 524 retrieves from queue 512 jobs which conform to the target protocol and submits those jobs through interface 110 to peripheral devices connected thereto, such as peripheral device 106. Output device feeder 524 updates directory entries, which correspond to jobs retrieved from queue 512, in queue directory 520. When peripheral device 106 has completed processing of a job, output device feeder 524 deletes from queue directory 520 the directory entry corresponding to the completed job. Output device feeder 524 and rasterizer 504 retrieve jobs from queue 512 at the direction of scheduler 510.

In one embodiment, efficiency is improved when peripheral device 106 is idle and rasterizer 504 is generating a job which conforms to the target protocol and is destined for peripheral device 106. In this embodiment, scheduler 510 directs rasterizer 504 to transmit the newly generated job directly through interface 110 to peripheral device 106, bypassing queue 512 and output device feeder 524.

Software 206A is further capable of transmitting jobs which conform to the target protocol through computer 102 and network 104 (FIG. 1E) to peripheral devices (not shown) connected to computer 102 through network 104. At the direction of scheduler 510 (FIG. 5), spooler 508 retrieves from queue 512 jobs which conform to the target protocol and transmits through computer 102 and network 104 (FIG. 1E) the retrieved job.

A queue manager 526 is in data communication with computer 102, queue directory 520, and queue 512 and enables users of computer 102 to manipulate jobs in queue 512. Queue manager 526 retrieves from queue directory 520 information regarding jobs in queue 512 and transmits that information to computer 102 or through computer 102 and network 104 (FIG. 1E) to other computers, e.g., computers 102A and 102B. Queue manager 526 (FIG. 5) also receives from computer 102 instructions to move, suspend, abort, or delete a job which is in queue 512 and, in response thereto, respectively (i) moves the job with respect to positions of other jobs within queue 512, (ii) suspends the job in queue 512, (iii) causes processing of the job by either rasterizer 504 or output device feeder 524 to be aborted, or (iv) deletes the job from queue 512. When queue manager 526 modifies a job within queue 512, queue manager 526 updates the directory entry in queue directory 520 corresponding to the modified job.

Thus, software 206A of peripheral preprocessor 108 (FIG. 1E) receives from computer 102 jobs which conform to the source protocol, processes those jobs to generate jobs which conform to the target protocol, and submits the jobs conforming to the target protocol to peripheral device 106. Computers 102A and 102B can submit jobs which conform to the source protocol through network 104 and computer 102 to peripheral preprocessor 108. Since peripheral preprocessor 108 in the embodiment of FIG. 1E includes a processor which executes software 206A, the processing of jobs within peripheral preprocessor 108 burdens the resources of computer 102 only slightly, as a result of the transfer of jobs from network 104 through computer 102 to peripheral preprocessor 108.

Each of the embodiments shown in FIGS. 1A–1E represents a significant improvement over the prior art as expensive upgrades of peripheral devices such as high-quality, high-resolution printing devices are obviated. Instead, compatibility with newly developed protocols is achieved with relatively little expense.

New job generator 304 (FIG. 3) is described as processing jobs according to a single source protocol and generating jobs according to a single target protocol. A second embodiment of new job generator 304, i.e., new job generator 304A (FIG. 4A), processes jobs according to one of two source protocols. New job generator 304A includes a first raster image processor, i.e., RIP, 314A and a second RIP 314B. RIP 314A processes jobs according to a first source protocol, and RIP 314B processes jobs according to a second source protocol. While new job generator 304A is shown to include two raster image processors, it is appreciated that new job generator 304A is not so limited and can include any number of raster image processors.

Figure 4A:
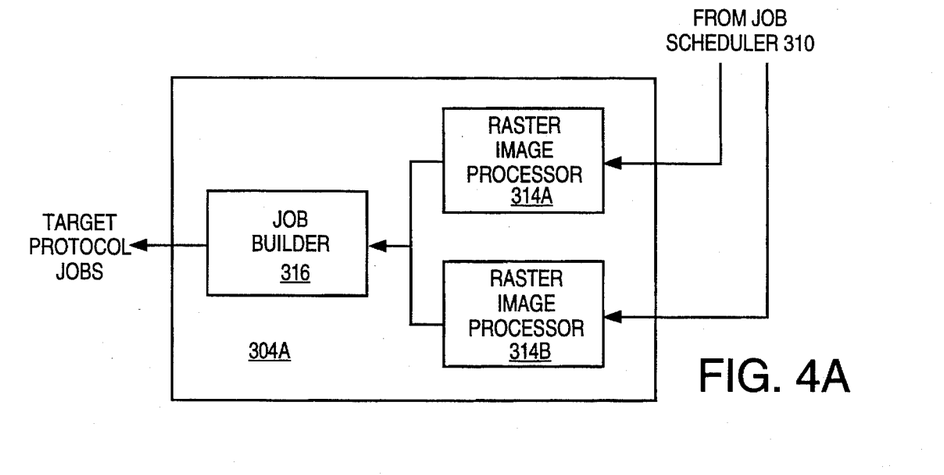
FIG. 4A is an alternative embodiment of the new job generator of FIG. 3 which includes multiple raster image processors.

Job scheduler 310 (FIG. 3) determines to which of RIPs 314A and 314B (FIG. 4A) to send jobs retrieved from queue 312 (FIG. 3). Such a determination can be made by examining jobs retrieved from queue 312 to determine to which of the first and second protocols the retrieved job conforms. If the retrieved job conforms to the first source protocol, the retrieved job is submitted to RIP 314A (FIG. 4A). If the retrieved job conforms to the second source protocol, the retrieved job is submitted to RIP 314B.

Both RIPs 314A and 314B produce from submitted jobs bit-mapped images which are submitted to job builder 316 which is described above. Concurrent processing by RIPs 314A and 314B is accomplished using well-known concurrent processing techniques. Using new job generator 304A in place of new job generator 304 (FIG. 3) enables peripheral device 106 (FIG. 1A) to render images defined by jobs generated within computer 102 according to either the first source protocol or the second source protocol.

Figure 4B:
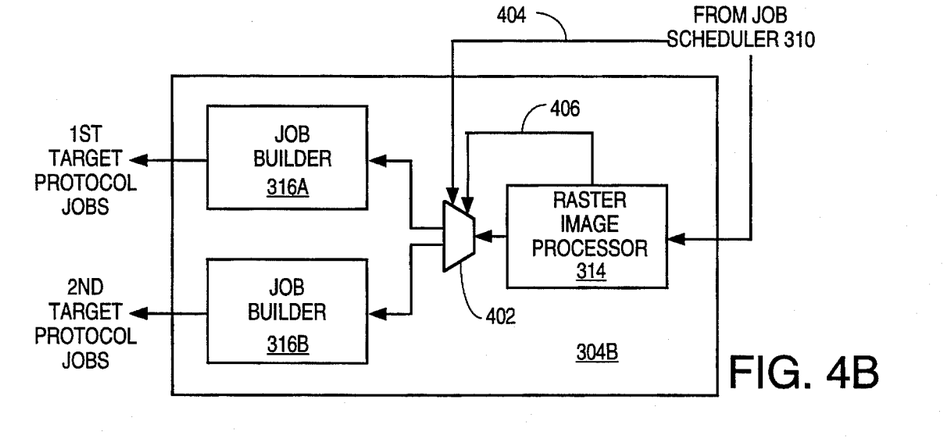
FIG. 4B is an alternative embodiment of the new job generator of FIG. 3 which includes multiple job builders.

A third embodiment of a new job generator is shown in FIG. 4B. New job generator 304B includes RIP 314C and a first job builder 316A and a second job builder 316B. Job builder 316A builds jobs according to a first target protocol, and job builder 316B builds jobs according to a second target protocol. Jobs generated according to the first target protocol by job builder 316A are submitted to a first peripheral device in the manner described above with respect to the submission of jobs to peripheral device 106 (FIG. 1). Similarly, jobs generated according to the second target protocol by job builder 316B (FIG. 4B) are submitted to a second peripheral device.

RIP 314C processes jobs received from job scheduler 310 (FIG. 3) to produce a bit-mapped image as described above with respect to RIP 314 (FIG. 3). The bit-mapped image is then submitted to either job builder 316A (FIG. 4B) or job builder 316B as represented by demultiplexer 402. Job scheduler 310 (FIG. 3) controls to which of job builders 316A (FIG. 4B) and 316B the bit-mapped image is submitted as illustrated by control line 404, which is shown to be connected to the select terminal of demultiplexer 402. Job scheduler 310 (FIG. 3) determines to which job builder to submit the bit-mapped image based on information regarding the state and availability of the first and second peripheral devices. The type of information to which job scheduler 310 has access is described above in greater detail.

Alternatively, RIP 314C (FIG. 4B) determines to which of job builders 316A and 316B to submit the bit-mapped image according to data included in the job processed by RIP 314C as shown by control line 406 which is connected to the select terminal of demultiplexer 402. Control lines 404 and 406 are used in respective alternative embodiments and are not used together in the same embodiment. By controlling demultiplexer 402 by control line 406, a user can specify on which of the first and second peripheral devices the image defined by a job is ultimately rendered. While new job generator 304B is shown to include two job builders, it is appreciated that new job generator 304B is not so limited and can include any number of job builders.

Figure 4C:
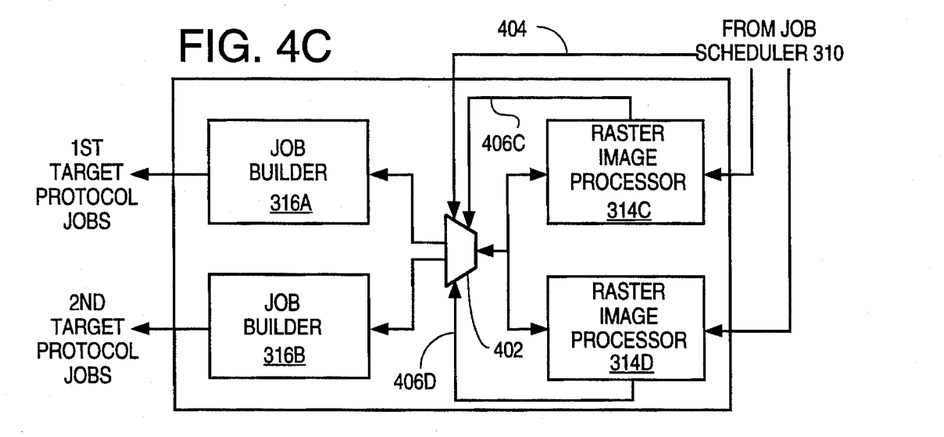
FIG. 4C is an alternative embodiment of the new job generator of FIG. 3 which includes multiple raster image processors and multiple job builders.

New job generators 304A and 304B (FIGS. 4A and 4B, respectively) can be combined to form a fourth embodiment which accepts jobs conforming to the first and second source protocols and generates jobs according to the first and second target protocols. New job generator 304C (FIG. 4C) includes RIPs 314C and 314D and job builders 316A and 316B. RIPs 314C and 14D operate as described above with respect to RIPs 14A and 314B of FIG. 4A. Job builders 316A and 316B (FIG. 4C) operate as described above with respect to FIG. 4B. In respective alternative embodiments, demultiplexer 402 is controlled (i) by job scheduler 310 (FIG. 3) through control line 404 or (ii) by RIPs 314C and 314D (FIG. 4C) through respective control lines 406C and 406D. Concurrent processing by RIPs 314C and 314D is accomplished using well-known concurrent processing techniques.

The above description is illustrative only and is not limiting. The scope of the present invention is limited only by the claims which follow.

What is claimed is:

1. A method for submitting a first job, the first job conforming to a source protocol and defining a task to be performed by a peripheral device, for the peripheral device which accepts jobs conforming to a target protocol, the method comprising the step of building from the first job a second job, the second job conforming to the target protocol and defining the task, wherein the step of building a second job is not performed in the peripheral device.

2. The method of claim 1 further comprising:
   submitting the second job to the peripheral device.

3. The method of claim 1 further comprising:
   accepting the first job prior to the step of building the second job.

4. The method of claim 3 wherein the step of accepting the first job comprises:
   scheduling the first job.

5. The method of claim 4 wherein the step of scheduling the first job comprises:
   placing the first job in a queue from which the first job is retrieved prior to the step of building the second job.

6. The method of claim 1 wherein the peripheral device is a graphical display device and further wherein the source protocol and the target protocol are graphical image description languages.

7. An apparatus for submitting a first job, the first job conforming to a source protocol and defining a task to be performed by a peripheral device, for the peripheral device which accepts jobs conforming to a target protocol, the apparatus comprising a new job generator for building from the first job a second job, the second job conforming to the target protocol and defining the task, wherein the new job generator does not reside within the peripheral device.

8. The apparatus of claim 7 wherein the peripheral device is a graphical display device and further wherein the source protocol and the target protocol are graphical image description languages.

9. The apparatus of claim 7 further comprising:
   a job handler, operatively coupled to the new job generator, for accepting jobs conforming to the source protocol and for submitting the accepted jobs to the new job generator.

10. The apparatus of claim 9 wherein the job handler comprises:
    a job scheduler for scheduling one or more jobs accepted by the job handler for processing by the new job generator.

11. The apparatus of claim 10 wherein the job handler further comprises:
    a job spooler; and
    a job queue, operatively coupled between the job spooler and the job scheduler, into which jobs are placed by the job spooler and from which jobs are retrieved by the job scheduler.

12. A method for submitting a first job, the first job conforming to a first graphical image description language and defining a task to be performed by a graphical display device, to the graphical display device which accepts jobs conforming to a second graphical image description language, the method comprising the step of building from the first job a second job, the second job conforming to the second graphical image description language and defining the task, wherein the step of building a second job is not performed in the graphical display device and the step of building a second job comprises:
    reducing a graphical description contained in the first job into a bit-mapped image; and
    building from the bit-mapped image the second job by inserting graphical commands of the second graphical image description language before and after the bit-mapped image.

13. The method of claim 12 wherein the bit-mapped image is customized to the rendering parameters of the graphical display devise.

14. An apparatus for submitting a first job, the first job conforming to a first graphical image description language and defining a task to be performed by a graphical display device, to the graphical display device which accepts jobs conforming to a second graphical image description language, the apparatus comprising a new job generator for building from the first job a second job, the second job conforming to the second graphical image description language and defining the task, wherein the new job generator does not reside within the graphical display device and the new job generator comprises:
    a raster image processor for reducing a graphical description contained in the first job into a bit-mapped image; and
    a job builder, operatively coupled to the raster image processor, for building from the bit-mapped image the second job by inserting graphical commands of the second graphical image description language before and after the bit-mapped image.

15. The apparatus of claim 14 wherein the bit-mapped image is customized to the rendering parameters of the graphical display device.

\* \* \* \* \*